(12) United States Patent
Earlywine

(10) Patent No.: US 7,831,397 B2
(45) Date of Patent: Nov. 9, 2010

(54) FORCE BEAM ELEVATOR AND METHOD OF USE FOR DETERMINING ABSOLUTE FLOW AND FOR CALIBRATION

(75) Inventor: Kenneth G. Earlywine, Vancouver, WA (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 379 days.

(21) Appl. No.: 12/009,573

(22) Filed: Jan. 18, 2008

(65) Prior Publication Data
US 2009/0187355 A1    Jul. 23, 2009

(51) Int. Cl.
*G01F 1/80* (2006.01)
(52) U.S. Cl. ........................................................ 702/45
(58) Field of Classification Search .................. 702/45, 702/50, 98, 104, 119, 138, 182, 183; 73/700, 73/807
See application file for complete search history.

(56) References Cited
U.S. PATENT DOCUMENTS

| | | | |
|---|---|---|---|
| 4,794,544 A | 12/1988 | Albright et al. | |
| 5,754,446 A | 5/1998 | Fisher et al. | |
| 5,808,203 A * | 9/1998 | Nolan et al. | 73/700 |
| 5,864,183 A | 1/1999 | Fisher et al. | |
| 5,953,227 A | 9/1999 | March et al. | |
| 6,269,287 B1 | 7/2001 | March | |
| 6,490,506 B1 | 12/2002 | March | |
| 6,841,893 B2 | 1/2005 | Maiwald et al. | |
| 7,540,200 B2 * | 6/2009 | Yung et al. | 73/807 |

* cited by examiner

*Primary Examiner*—Mohamed Charioui
(74) *Attorney, Agent, or Firm*—Earl H. Baugher, Jr.

(57) ABSTRACT

A system for ascertaining absolute fluid flow in a passageway comprises: a force beam that is inserted into a fluid; a carriage to support the beam, the carriage enabling the beam to move vertically in a fixed plane; one or more load cells incorporated with the beam to measure force applied to the beam by the fluid flow; a data recorder and processor for integrating the measurements and for running algorithms that convert the integrated measurements into a value of absolute flow and a controller to operate the system. In some embodiments the force beam may be light and neutrally buoyant in the fluid. Measurements are taken at pre-specified intervals while moving the beam in a vertical plane perpendicular to the direction of fluid flow. One application is the calibration of Winter-Kennedy piezometers in the barrels of large water turbines. A method of use is also provided.

26 Claims, 4 Drawing Sheets

FORCE BEAM ELEVATOR AND METHOD OF USE FOR DETERMINING ABSOLUTE FLOW AND FOR CALIBRATION

STATEMENT OF GOVERNMENT INTEREST

Under paragraph 1(a) of Executive Order 10096, the conditions under which this invention was made entitle the Government of the United States, as represented by the Secretary of the Army, to an undivided interest therein on any patent granted thereon by the United States. This and related patents are available for licensing to qualified licensees. Please contact Phillip Stewart at 601 634-4113.

BACKGROUND

There are two classifications of flow measurement in hydraulic turbines: absolute and relative. Absolute is divided into volumetric flow rate and weight flow rate. The terms apply to both reaction and impulse turbines. A reaction turbine is classified as such because of a pressure change across a turbine runner. Impulse turbines have no reaction, i.e., no change in pressure.

Relative flow measure means that flow is measured in relative terms. A surrogate parameter is measured and the relative flow is calculated (implied) from that measured surrogate. The actual flow rate is estimated or "indexed" via the flow's effect on the surrogate, thus a "relative efficiency test" is termed an index test. For example, as the flow in a turbine increases the water level in the gate slot decreases due to increased velocity head in the passage under the slot and increased trash rack losses. Thus, as flow increases the difference between the gate slot water height and the forebay height increases. Thus, the difference in height may be used as a surrogate measure of flow.

A standard method of measuring relative flow employs Winter-Kennedy piezometers or WK's. Two WK's are placed on the spiral (or semi-spiral) case of a turbine, one on the inside and the other on the outside in the same radial plane. The difference in angular momentum due to different radial displacement from the center of rotation generates a difference in piezometric pressure on the two taps. Since angular momentum is a function of the square of the velocity, the relative flow rate is proportional to the square root of the difference in piezometric pressure. Since this method measures change in angular momentum, it is measuring a relative weight flow rate. However, when it is independently calibrated, it is done in terms of an absolute volumetric flow rate.

Relative flow is often used to establish a relative efficiency profile, e.g., the power level at which peak efficiency occurs and the "one percent" operating limits, since a 1% change in relative efficiency equates to a 1% change in absolute efficiency. Further, in Kaplan turbines, relative flow may be used to establish the optimum blade to gate cam curve.

A relative flow measure applies only to the unit on which it is measured, i.e., the same absolute flow rate in two different units will produce different calibrations of the WK's. Thus, the relative efficiency of two units can not be compared and "absolute efficiency" measures must be employed for any meaningful comparison.

Techniques exist to measure absolute flow in hydraulic turbines, but most have limited application, such as requiring a constant cross section over a length of the flow passage. Thus, for run of the river Kaplan turbines where the shape of the water in the passage is continually changing, only a few methods of questionable accuracy are available.

The current ASME test code, PTC 19-2002, describes the following methods of flow measuring: current meter, pressure-time, ultrasonic, Venturi meter, dye solution, and volumetric as well as the thermodynamic method of measuring efficiency. The 1992 ASME test code described other methods to include pitometer, pitot tube, and salt velocity. Other methods include: traveling screen, weir and scintillation.

Conventional current meters used today are of the type employing the "point velocity methods." Point velocity methods measure point velocities over a cross section and integrate the resulting measurements to yield mean velocity and from that, flow rate. Current meters employ small propellers mounted to a frame in a water passage. The speed of rotation of the propeller is proportional to the current velocity. These meters are calibrated in a laboratory flume. Variance in current meter measurements is introduced by the obstruction to flow from the frame itself and the misalignment of the meter with respect to the velocity vector.

Another method is the pressure-time method, or Gibson method, that measures a transient pressure increase or "water hammer" resultant from a rapid closure of the wicket gates causing the momentum of the fluid column in the penstock to decrease. Integrating the change in momentum over time yields a weight flow rate that must be converted to a volumetric flow rate.

There are three ultrasonic methods for measuring flow. The first measures separate transit times of pulses sent obliquely upstream and downstream and averages the velocity vectors of the fluid crossing the path taken by the ultrasonic pulses. Other methods measure the refraction of an ultrasonic beam by fluid velocity or by measuring the Doppler frequency shift of an ultrasonic signal reflected by flowing water or by moving particles. The first method is accepted by the ASME code and its accuracy is a function of the number of acoustic paths averaged over the monitored cross section.

Venturi meters are used to measure absolute flow in piping such as that used in smaller penstocks of hydraulic turbines or in the lab. A Venturi, also termed a DeLaval nozzle, measures the difference between the pressure head at the inlet and at the minimum cross section to establish flow rate.

The dye dilution method injects a dye tracer upstream at a constant rate into the flow. Samples are drawn downstream upon complete mixing and analyzed to determine concentration. Flow rate is proportional to the dilution experienced by the dye.

The volumetric method establishes average flow rate by monitoring the change in a reservoir's fluid height over time. The method requires a survey of the reservoir to establish an accurate relationship between volume change and fluid height.

The thermodynamic method measures the efficiency of the turbine directly by accurately measuring the temperature of the water before and after the turbine and calculates the flow rate from the difference in the temperature. Because of the high specific heat of water, this method is restricted to turbines having a hydraulic head greater than 300 feet.

The Cole Reversible Pitometer is a point source method that uses the difference in pressure created by flow over a pair of movable orifices to yield local velocity. One orifice faces directly upstream and the other downstream. The upstream orifice measures the water flow and its velocity directly and the downstream orifice measures the effect induced by the suction from the wake of the water flow around the orifice.

The Pitot Static Tube is another point source method like the Cole unit except that the second orifice is at 90° to the upstream facing one, generally on the side of the penetrating pipe used to house the first orifice.

The Allen Salt Velocity method uses a "slug" of salt to increase the electrical conductivity of the water. Knowing where the slug is inserted and where the electrical conductivity of the water containing the dispersed slug is taken downstream, the time difference is used to establish average velocity and then calculate average flow.

The Anderson Traveling Screen method employs an impermeable screen mounted on tracks that is inserted perpendicular to the flow. It is very accurate but suitable for measuring flow only in relatively narrow open channels of uniform cross section due to its configuration.

Weirs are used to measure flow in an open channel, being analogous to a dam being overtopped. Sharp crested weirs have a thin knife-edge top whereas a broad-crested weir allows the water flowing on top to reside there for a sufficient time to establish a critical depth. In both types, the height of the water column behind the weir is measured to estimate flow rate.

The scintillation method employs acoustic signals to map the passage of a turbulence pattern on a horizontal line in a vertical cross section and records the passage of that same "map" as it occurs a short distance downstream before momentum can change the pattern. The time to travel the short distance yields an average local velocity. Integrating the local velocities across a series of acoustic beams in a vertical cross section then yields a flow rate estimate.

For all methods of measuring absolute flow, only a few may be used with the large Kaplan turbines. The pressure-time (Gibson) and Allen (salt) methods are eliminated because of the absence of a constant flow cross section over a significant length. The Venturi method is used only with penstocks. The low hydraulic head of a Kaplan turbine eliminates the Thermodynamic Method. The volumetric and Anderson (moving screen) methods can not be used where the natural river is both the forebay and the tailrace. Kaplan turbines on rivers have multiple intake bays and each bay on a turbine has different flow rates, eliminating the dye dilution method that requires an injection proportional to flow rate in each bay. The pitometer methods are not useful for large intakes used in Kaplan turbines since the number of pitometer lines needed to be drawn up the gate or bulkhead slots would be unmanageable.

Ultrasonic methods have been used on Kaplan turbines with some success, however, the large intake barrels require a large number of transducers that must be permanently mounted to be aligned obliquely to the flow, thus the initial setup cost per unit is high.

The scintillation method may be applied to "run of the river" Kaplan turbines, however, experience has shown that the method significantly underestimates actual flow. Further, the cost of a scintillation frame is about $300,000 in 2007 dollars for a typical intake gate slot, while the test contractor charges about $75,000-100,000 per test. Further, the flow estimates are not available until several months after test.

Currently there are devices commercially available that can measure flow in turbine units served by penstocks. Employing these devices is so expensive that many projects choose not to use them. For turbines that have short intakes without penstocks, there is no reasonably cost effective and accurate method for measuring absolute flow. By accurately measuring absolute hydraulic flow (Q), the maximum efficiency for individual turbine units may be determined. For example, accurately measuring Q identifies those units that are most efficient and should be employed the most, i.e., economic unit dispatch.

Thus, what is needed is a cost effective method employing commercial off-the-shelf (COTS) components that may be employed in various configurations without unduly interfering with operations of existing systems. The measurement apparatus should also provide "real time" accurate absolute flow measurements. Select embodiments of the present invention provide this capability.

DETAILED DESCRIPTION

Figure 1:
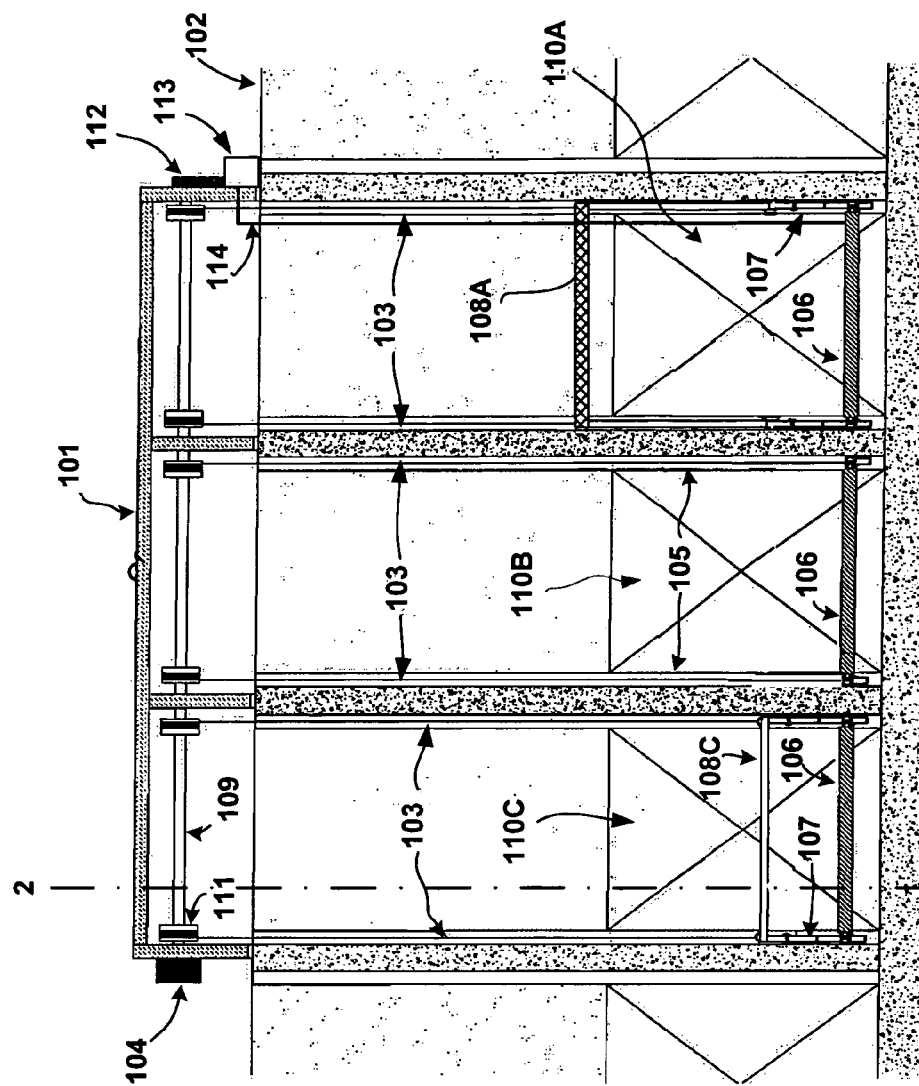
FIG. 1 is a front elevation view of three variations of a select embodiment of the present invention as may be installed at turbine intake barrels at a dam.

In select embodiments of the present invention, a method for ascertaining absolute fluid flow in a passage way comprises: inserting into a fluid a configuration of known cross section that incorporates one or move instruments (sensors) for measuring force applied to the configuration, i.e., the force resultant from the fluid flow; moving the configuration in a vertical plane approximately perpendicular to the direction of the flow while taking measurements of the force at pre-specified intervals via the sensors; recording the measurements; integrating the measurements; and, employing one or more algorithms, converting the integrated measurements into a value of absolute flow. In select embodiments of the present invention, the configuration of known cross section incorporating one or more instruments is light and neutrally buoyant in the fluid.

In select embodiments of the present invention, the method further comprises adjusting the value of absolute flow to account for factors impacting the measurement of the force. In select embodiments of the present invention the adjustment is accomplished by employing one or more algorithms.

In select embodiments of the present invention, the method is also employed to calibrate instruments for determining flow.

In select embodiments of the present invention, the passage way is an intake barrel of a water turbine. In select embodiments of the present invention, the passage way is an open channel of known cross section.

In select embodiments of the present invention, the configuration of known cross section is a cylinder, such as a pipe.

In select embodiments of the present invention, the instrument is a load cell.

In select embodiments of the present invention, the load cells comprise two load cell pairs, one pair mounted on each end of the cylinder restraints, each load cell of a pair mounted approximately 900 one from the other and each load cell mounted approximately 45° from the horizontal (x) plane.

In select embodiments of the present invention the configuration is pre-loaded employing bolts connected to two ends of the configuration.

In select embodiments of the present invention, a system for ascertaining absolute fluid flow in a passage way comprises: a configuration of known cross section that is inserted under pre-specified conditions into a fluid; a carriage to support the configuration, the carriage enabling the configuration to move vertically in a fixed plane; one or more instruments (sensors) incorporated with the configuration, such that the instruments take measurements of force applied to the configuration, the force resultant from the fluid flow, the measurements taken at pre-specified intervals while moving the configuration in a vertical plane approximately perpendicular to the direction of the fluid flow; one or more data recorders for recording the measurements; one or more computing devices for integrating the measurements and for running one or more algorithms that convert the integrated measurements into a value of absolute flow; and one or more control mechanisms that facilitate operation of the system. In select embodiments of the present invention, the configuration of known cross section incorporating one or more instruments is light and neutrally buoyant in the fluid.

In select embodiments of the present invention, an algorithm is employed to adjust the integrated measurements for error induced by the measurement technique.

In select embodiments of the present invention, the configuration of known cross section is a cylinder, such as a pipe.

In select embodiments of the present invention, the instrument is one or more load cells. In select embodiments of the present invention, the load cell are arranged in, one pair mounted on each end of a cylinder, each load cell of a pair mounted approximately 90° one from the other, each load cell mounted approximately 45° to the horizontal (x) plane.

In select embodiments of the present invention, the system comprises one or more loading bolts for pre-loading the configuration.

In select embodiments of the present invention, the configuration is emplaced in a trolley incorporating: connection points for mounting the configuration; plates for mounting the instruments; wheels for aligning and maintaining the configuration in relation to the direction of the flow; and one or more connectors for affixing to one or more cables for hoisting the trolley.

In select embodiments of the present invention, the system employs one or more stabilizer devices for stabilizing the configuration in the flow.

In select embodiments of the present invention, the system employs a support for carrying and operating the carriage, the support comprising: one or more drum hoists; one or more cables connected to a drum hoist; one or more hoist shafts connected to one or more drum hoists; one or more motors connected with the hoist shafts; a frame supporting the drum hoists, the hoist shafts and the motor, such that one or more each of drum hoists, hoist shafts and motors are affixed to the frame, and such that the cables are connected to the configuration to enable vertical transport thereof.

In select embodiments of the present invention, the frame incorporates connection points for mounting a data recorder, a computing device and the controller apparatus.

In select embodiments of the present invention, the system employs communications links between the control apparatus, the data recorder device and the instruments, the communications links selected from the group consisting of: hard wire, fiber optics, wireless transmission paths, sonic paths, hydraulic paths, pneumatic paths, and combinations thereof.

In select embodiments of the present invention the data recorder is incorporated in the instruments (sensors).

In select embodiments of the present invention, the system is employed to calibrate flow measurement devices.

Select embodiments of the present invention are able to cost effectively measure flows for all turbine types. No permanent modifications to a power plant or its machines are required. Further, select embodiments of the present invention are portable, thus a single unit could measure flows in all turbines at a given site. For example, one apparatus may calibrate all Winter-Kennedy's (WK's) for all units. Once properly calibrated, the WK's could be used on demand to define absolute flow and maximize efficiency within the individual units and maximize the efficiency of unit dispatch, i.e., placing units in service in the order of inherent efficiency. Accurately measuring Q could increase power outputs at hydroelectric dams from 1% to 5% using the same amount of water. A 1% efficiency gain for one 85 MW turbine yields annual benefits of about $223,000 in 2007 dollars. There are over a hundred turbines in the U.S. Pacific Northwest alone. Accurately measuring Q with select embodiments of the present invention would yield a 100% return on investment (ROI) in a few months. Another application for select embodiments of the present invention is accurate measurement of open channel flow in a flume with a defined cross section.

Conventionally, attempts to quantify volumes of flow in hydroelectric turbines focused on measuring the velocity and direction of water flow. This is very difficult due to the variance in direction and velocity of the water. Select embodiments of the present invention derive hydraulic flow, Q, by measuring kinetic energy exerted by water mass on an object suspended in the flow. In select embodiments of the present invention, the object is preferably a cylindrical beam that spans the width of turbine intakes. In select embodiments of the present invention, the beam is raised at a uniform rate from the bottom of the intake barrel to the top. Load cells connected to the end restraints of the beam collect measurements of the force (resultant drag) exerted on the beam by the flow. As the beam is raised the measurements from the end loadings are summed and recorded. From this data, average velocities are calculated. By summing incremental average velocities, the average velocity for the cross-sectional area of the intake barrel is derived. This measured average velocity multiplied by the cross-sectional area yield total flow, Q, entering the turbine.

The direction and magnitude of the summation of the force vectors acting upon a cylindrical beam suspended in a hydraulic flow in a conduit with a defined cross-section can be determined by measuring the forces exerted upon the end constraints of the beam, provided that the beam is elevated thru the entire length of this cross-sectional area at a constant rate. This is the basic concept upon which select embodiments of the present invention are based.

Consider a pipe suspended within a fluid flow subjected to drag forces defined by:

$$F_p = \frac{\delta A w v^2}{2g} \quad (1)$$

where:
$F_p$=drag force on the pipe
$\delta$=drag coefficient
A=area of pipe presented to the flow
w=fluid weight
v=velocity of fluid
g=gravity constant The drag coefficient, δ, is a function of the Reynolds Number and varies with the shape of the object and the velocity of the flow. Table 1 shows the calculated change in δ as a function of Reynold's Number and fluid velocity for a 12" diameter pipe.

TABLE 1

Drag coefficient as a function of Reynold's Number.

| Velocity (ft/s) | Reynold's No. (×10$^6$) | Drag Coefficient, δ |
|---|---|---|
| 4 | 0.37 | 0.18 |
| 8 | 0.74 | 0.206 |
| 12 | 1.1 | 0.266 |
| 16 | 1.49 | 0.319 |
| 20 | 1.86 | 0.367 |

For a pipe (cylinder), δ does not vary significantly for the range of conditions experienced within a hydroelectric unit, thus δ for a pipe may be approximated to be 0.34 in highly turbulent flows. An exact drag coefficient can be determined by testing. The cylinder is the only shape maintaining the same δ regardless of flow direction in the x-y plane. If the pipe is raised at a constant rate from bottom to top of a turbine passage, the measured forces may be integrated to determine the average force. From this calculation, the average velocity is calculated using Eqn. (1) and thus the absolute flow rate may be accurately provided.

Select embodiments of the present invention, descriptively termed a "force beam elevator," accurately measure absolute flow within the fluid passageways of hydroelectric generation units. Select embodiments of the present invention may be installed with no permanent modifications to the power plant or its machinery. The well-known Winter-Kennedy method may be used to determine the water flow rate through the turbine. Specifically, this method is carried out by placing a pair of Winter-Kennedy (WK) differential pressure taps in the spiral flow case and a differential pressure transducer placed across these taps generates a signal corresponding to the measured differential pressure. Although the Winter-Kennedy method is preferred, many others are available and may be used, including the "Joseph Peck" method, the calibrated weir method, the current meter method, the pitot tube method, and the like. Within a family of turbines, select embodiments of the present invention could be used to calibrate all WK taps for all units. Once properly calibrated, the WK's could be used on demand to define absolute flow, maximizing efficiency within the individual unit and, thus, maximizing the efficiency of unit dispatch.

To accurately estimate absolute flow using the above principle consider: (1) operation in conditions that are held constant during elevation of the beam (ideally a pipe); (2) maintenance of structural integrity of the beam under load and vibration; (3) accurate measurement of end restraint forces to determine force vectors; and (4) delivery and recording of the force measurements. Once recorded, the kinetic energy is converted to velocity which defines the flow in a known cross-sectional area, e.g., that of a turbine intake barrel.

Select embodiments of the present invention: (1) are able to operate within gate or stop log slots; (2) incorporate synchronized force beam elevators within each draft tube or barrel of a unit; (3) are of sufficient weight that the force beam is lowered by gravity alone; (4) automatically convert measurements into absolute flow; (5) are portable and easily installed in similar units; and (6) permit the force beam elevator to be wholly contained below deck and to be installed with existing gantry cranes.

Other considerations used in employing select embodiments of the present invention include: (1) the direction of the average force has no significant component in the horizontal (z) direction (parallel to the dam face) since the force beam elevator is in a conduit under head; (2) since fluid density is a function of temperature, a force beam elevator may be equipped with a thermometer to allow for changing density and, thus, a modification to the weight term, w; (3) load sensors must be robust, accurate and waterproof; (4) in select embodiments of the present invention, force beams may be neutrally buoyant if conditions warrant; (5) boundary conditions are addressed, as appropriate; (6) computed average velocity is adjusted to address head losses associated with a force beam being within the flow, and (7) flow surges result in highly dynamic loadings that necessitate a correction during data reduction. The force beam may be raised either incrementally, or at a constant rate, through a flow in a confined conduit, such as a turbine inlet.

Refer to FIG. 1, illustrating three select embodiments of the present invention, a different embodiment shown in each of the three complete intake barrels 110A, B, C depicted as one would face downstream on the upstream side of a dam. The ends of the "force beams" 106 are supported by movable "frames" or trolleys (hereafter trolleys) 107 that may be equipped with wheels 403 (FIG. 4) in select embodiments of the present invention. The force beam 106 measures loadings due to water current as the force beam 106 is raised from the bottom to the top of the intake barrels 110. In select embodiments of the present invention, the trolleys 107 are raised by cables 103 mounted to drums 111 turned by the hoist shaft 109 and motor 104 as may be located on a dam's intake deck 102. In select embodiments of the present invention, a data collector 112 and a controller 113 fed by a coax cable 114 from the load cells 503, 504 (FIG. 5) may be attached to the hoist frame 101. In select embodiments of the present invention, semi-circular shafts 301 (FIG. 3) attached to the ends of each force beam 106 are held rigidly in the trolleys 107 by loading bolts 402, 404 (FIG. 4) and a section of steel angle 401. In select embodiments of the present invention, between the shaft 301 and the steel angle 401 at each end of the force beam 106 are two load cells 503, 504 (FIG. 5), each 45 degrees off of vertical and horizontal planes, respectively.

The intake barrel 110A on the reader's right in FIG. 1, as may be used in select embodiments of the present invention, employs a "dry" stabilizer beam 108A as part of the trolley 107 that incorporates the force beam 106 that is positioned via cables 103 running in the existing side slots 105 of the intake barrels 110A, B, C. The stabilizer bar 108A shown in intake barrel 110A is dry because it never enters the water flow. The configuration of the trolley 107, the stabilizer beam 108A and the force beam 106 in intake barrel 110A is operated via cables 103 running in slots 105 in the intake barrel 110A and powered by a motor 104, the whole configuration 108A, 107, 106 supported by a hoist shaft 109 mounted in a support 101 on the deck 102. The support 101, shaft 109, and motor 104 may provide motivation to multiple configurations as emplaced in multiple intake barrels 110 on the same dam as shown in FIG. 1 for a sample of three intake barrels 110. In select embodiments of the present invention, a data collector 112 may be mounted on the support 101 or otherwise located nearby for collecting data from the sensors (load cells) 503, 504 (FIG. 5) on the ends of the force beam 106. In select embodiments of the present invention, a trolley 107 supporting the force beam 106 is supported at its four corners with rubber pneumatic wheels 403 (FIG. 4) as shown for the embodiments in intake barrels 110A and 110C of FIG. 1. The middle intake barrel 110B depicts a "frameless" configuration employing cables 103 directly connected from lifting drums 111 to each end of the force beam 106. In select embodiments of the present invention, a third alternative, i.e., a "wet" stabilizer beam 108C is employed in intake barrel 110C in a manner similar to that of the dry stabilizer beam 108A in intake barrel 110A, except that the wet stabilizer beam 108C will be in the water flow when the trolley 107 is at its lowest positions.

In select embodiments of the present invention, the wet stabilizer beam 108C may be preferred even though one may intuitively believe that a wet stabilizer beam 108C may yield less precise results due to drag when it is in the water flow. However, the head losses attributable to drag on a wet stabilizer beam 108C are insignificant when compared to the velocity head of the total flow. Also, drag forces acting on a wet stabilizer beam 108C are determinant. This is especially true if the wet stabilizer beam 108C is the same shape and size as the force beam 106. The adjustment may be accounted for in the calculations for absolute flow. The advantage of the wet beam design is that it is more stable than a frameless design shown in the intake barrel 110B while having a minimal profile that allows the entire configuration 108C, 106, 107 to be located below the deck 102 throughout the measurement process. This minimizes interference with deck access and operations.

TABLE 2

Computation of inaccuracies of force beam elevator due to flow variations.

| Velocity Range (ft/sec) | Average Velocity (ft/sec) | Measured Velocity (ft/sec) | Error (%) | Adjusted by code tolerance of 1.5% (%) |
|---|---|---|---|---|
| 2.5-5.5 | 4 | 4.080 | 2 | 0.5 |
| 3.5-6.5 | 5 | 5.065 | 1.3 | -0.2 |
| 4.5-7.5 | 6 | 6.122 | 2 | 0.5 |
| 5.5-8.5 | 7 | 7.100 | 1.4 | -0.1 |
| 6.5-9.5 | 8 | 8.067 | 0.8 | -0.7 |
| 7.5-10.5 | 9 | 9.060 | 0.7 | -0.8 |

Figure 2:
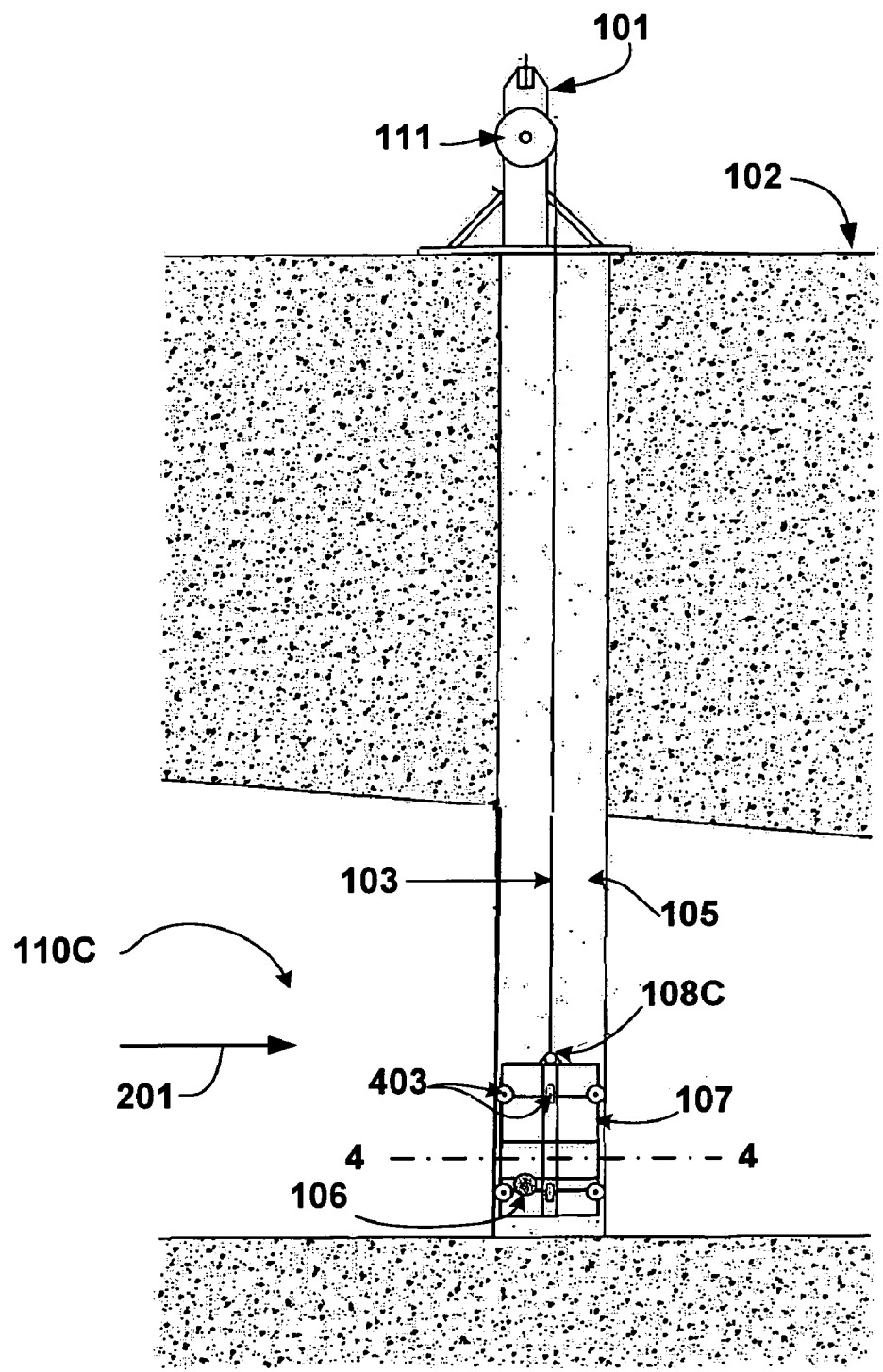
FIG. 2 is a side elevation view of an embodiment of the present invention viewed in a cross section of one of the turbine intake barrels of FIG. 1 taken at 2-2.

Refer to FIG. 2, an edge view of the intake barrel 110C taken through 2-2 of FIG. 1 with the water flow direction as shown at the arrow 201. The end of the force beam 106 is shown without the necessary sensors and mounting devices for clarity. The wet stabilizer beam 108C as shown in FIG. 2, is smaller in cross section than the force beam 106, but need not be as discussed above. The wheels 403 (FIG. 4) of the trolley 107 also need not be pneumatic as discussed below in describing FIG. 4. Further, for select embodiments of the present invention, the support 101 may be "individualized" together with the lifting drums 111, shaft 109 and motor to operate on single intake barrels 110 rather than as shown in FIG. 1 operating on multiple intake barrels 110. However, multiple intake barrels serving individual turbines should be measured simultaneously using like configurations of select embodiments of the present invention as well as identical lifting rates to preclude errors due to time lags between measurements that are taken separately at different times in the individual intake barrels. Embodiments of the present invention are readily portable for calibrating the W-Ks.

Figure 3:
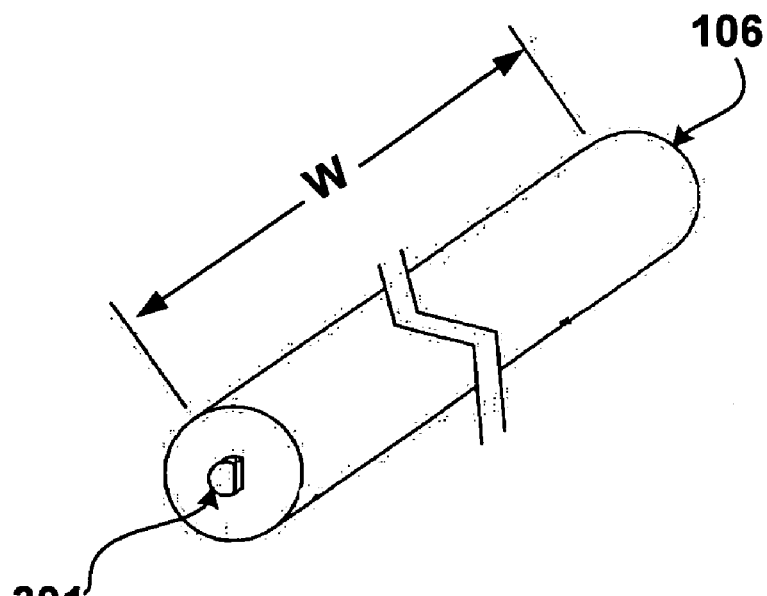
FIG. 3 is a perspective of a force beam as may be used in select embodiments of the present invention.

Refer to FIG. 3, depicting one configuration of a force beam 106 that may be used with select embodiments of the present invention. The end plate of the force beam 106 has a bearing pin 301 with a flat edge that facilitates pre-loading of the force beam 106 using a simple bolt and plate design as discussed below.

Figure 4:
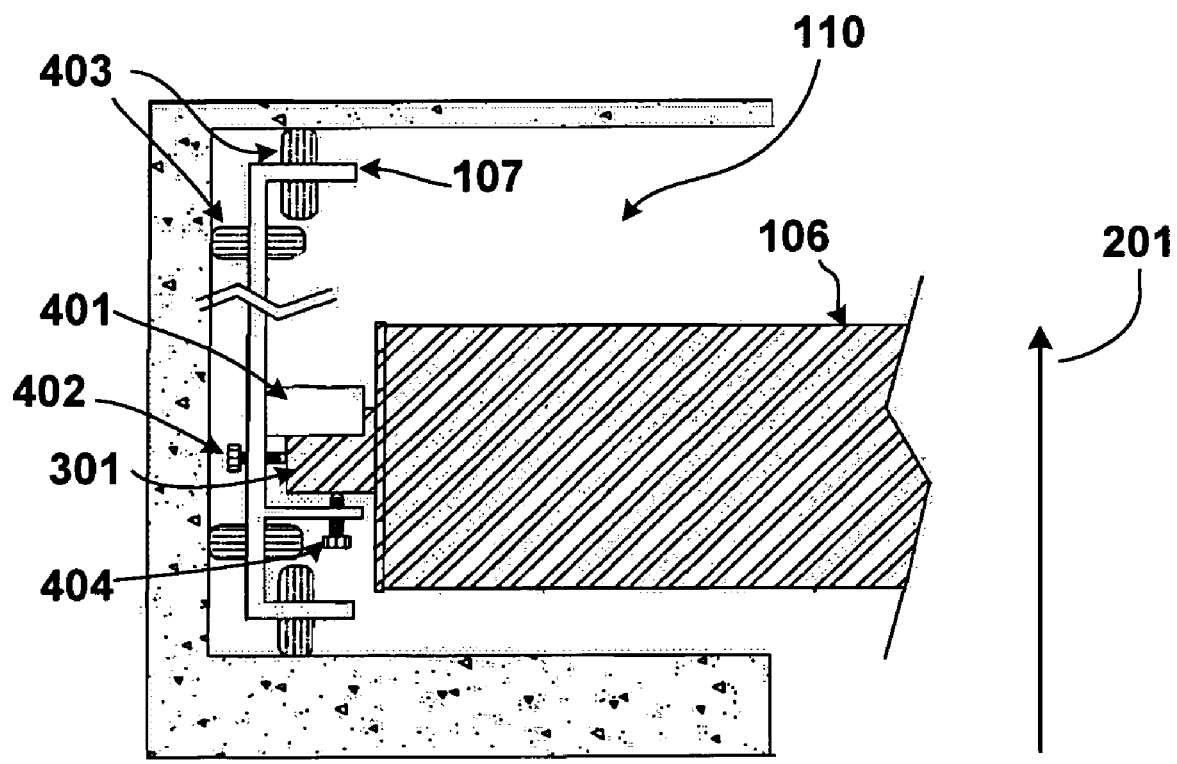
FIG. 4 is a top view of a select embodiment of the present invention as may be used in the turbine intake barrels of FIG. 1 as may be taken at 4-4 of FIG. 2.

Refer to FIG. 4, a top view through 4-4 of FIG. 2, describing a specific arrangement for stabilizing a force beam 106 that may be used in select embodiments of the present invention. In select embodiments of the present invention, the force beam 106 is stabilized at each of the bearing pins 301 via a bolt 402 thru the trolley 107 that prevents lateral movements. Each bearing pin 301 also has a "keeper plate" 401 mounted thereto for mounting load cells (sensors) 503, 504 (FIG. 5) thereto. In select embodiments of the present invention, the force beam 106 is preloaded by a bolt 404 through a mounting plate of the trolley to the bearing pin 301. For select embodiments of the present invention trolleys 107 for transporting a force beam 106 are custom built for each family of turbine, i.e., each type of intake barrel 110. In select embodiments of the present invention, a trolley 107 supports each end of both a force beam 106 and a stabilizer beam 108 and the trolley 107 is totally contained within a gate slot 105 of the intake barrel 110. In select embodiments of the present invention, the trolley 107 equipped with properly inflated pneumatic tires 403 facilitates interference-free travel along the gate slot 105 while absorbing surges and vibrations. In select embodiments of the present invention, means for assuring proper movement within the gate slots other than pneumatic tires 403 may be employed. In select embodiments of the present invention, the tires 403 may be inflated upon installation to create a tight fit of a trolley 107 within a gate slot 105. In select embodiments of the present invention, the force beam 106 is connected to the trolley 107 such that movement of the trolley 107 is constrained in the z direction (e.g. parallel to the face of the dam through which water flows and perpendicular to the flow of the water) (FIG. 5) by the force beam 106. In select embodiments of the present invention, a trolley 107 incorporates structural elements, e.g., flat plates, that secure a loading bolt 404 and load cells 503, 504 (FIG. 5).

Figure 5:
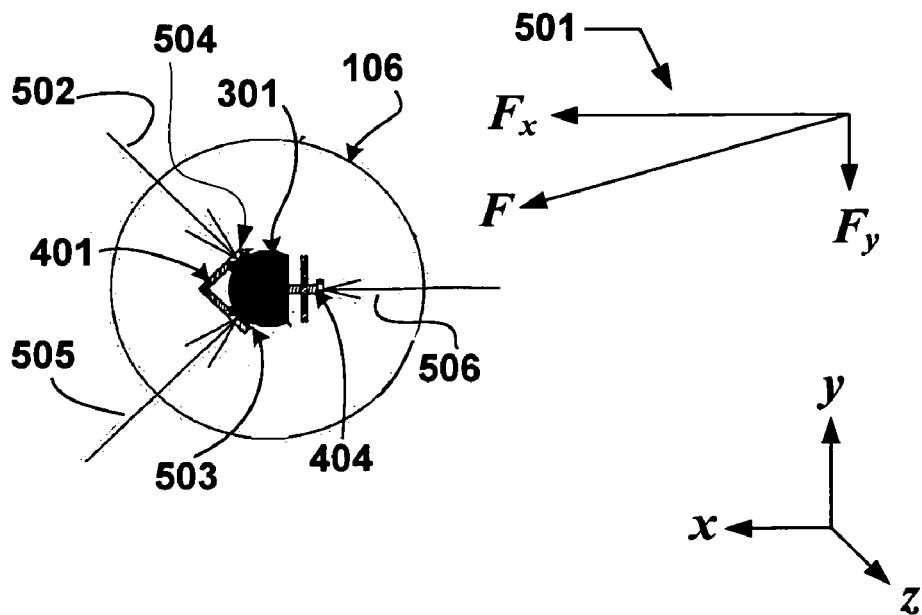
FIG. 5 is an elevation view of the installation of an end of a force beam such as represented by FIG. 3 as may be installed in the turbine intake barrels of FIG. 1.

Refer to FIG. 5, an elevation view of the installation of an end of a force beam 106 such as that represented in FIG. 3. Upon insertion of the force beam 106 in the water flow as indicated at 501 the force beam is "impacted" by the water flow as indicated by the Force F (having a larger component in the x direction, $F_x$, than in they direction, $F_y$). The load cells 503, 504 are pre-loaded by the force bolt 404 and the hydraulic loading on the individual load cells 503, 504 is the change in loading that occurs between inflow and outflow conditions. The ratio of the changes in the two load cells 503, 504 defines the direction and magnitude of the summation of the force vectors 502, 505. In select embodiments of the present invention, two load cells 503, 504 and a loading bolt 404 are employed for each end of the force beam 106. The direction and magnitude of the average resultant force vector acting on the whole force beam 106 is derived by summing the average resultant force vectors acting on each end of the force beam 106. The absolute flow is thus derived for a single intake barrel 110 and added to the absolute flows derived from any other intake barrels 110 serving the unit. In select embodiments of the present invention, measured and recorded loading values are used to determine the instantaneous velocity and direction of the flow through the x-y plane. The absolute flow through a turbine is the summation (obtained by integrating individual readings) of the flows calculated from the loadings on the force beam 106 as it vertically samples the intake barrels 110 serving a turbine.

To determine the flow at a cross section of a turbine's intake barrel 110, the forces acting in the x (horizontal) direction (e.g., perpendicular to the dam face) are summed. The total force in the x direction is the total loadings measured by each of the load cells 503, 504 at each end of the force beam 106 multiplied by 0.707 (sin, cos of 45°, respectively, of the two resultant forces 502, 505 measured by the load cells 503, 504, respectively) minus the pre-load 506 of the loading bolt 404, assumed to have been pre-loaded along the x-axis.

Figure 6:
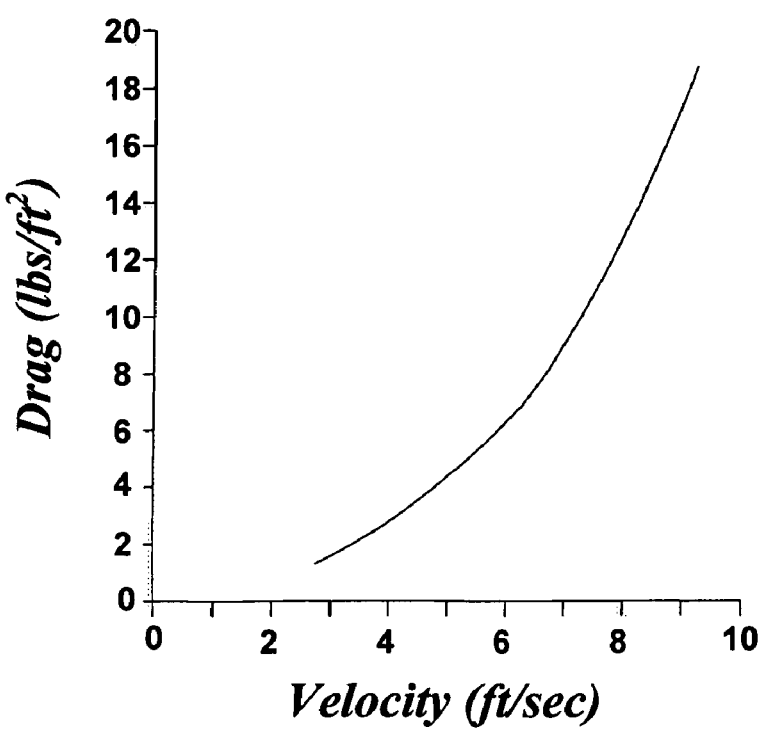
FIG. 6 depicts the relationship of drag to velocity for a typical cylindrical pipe of one foot diameter as may be incorporated in select embodiments of the present invention.

Load calculations may be converted to fluid velocities using information shown in the graph of FIG. 6 relating drag force to velocity for a pipe having a one foot diameter such as may be used for the force beam 106 of select embodiments of the present invention. For example, the graph of FIG. 6 covers the typical range of velocities found in turbine barrel intakes of dams. The graph of FIG. 6 was created using a drag and velocity calculator for cylindrical objects in flowing water.

The accuracy of the graph of FIG. 6 may be improved by performance tests on a beam, such as a pipe, with the actual materials and diameter to be used. An example is provided below.

Assume: a standard 12 in.-diameter pipe for the force beam 106, a span of 28 ft for the intake barrel 110 and a water flow of 10 fps. Using Eqn. (1):

$$F_p = (0.34)(1 \times 28)(62.3)(10^2)/(2)(32.2) = 921 \text{ lbs}$$

This loading is trivial when compared to the loading capacity of a 12 in. steel pipe, even when dynamic forces are accounted for. In the above example, assuming the height of the barrel is 45 ft, the velocity head, $V_h$, of the water per second is mass times velocity or:

$$[(62.4)(28)(45)] \times [10] = 786,240 \text{ lbs/sec}$$

Thus the head loss associated with a beam being in the flow is about one tenth of one percent of the velocity head per second.

Note that even at the upper end of the velocities seen in intake barrels 110, the load on a beam such as either a force beam 106 or a stabilizer beam 108 is less than 1000 lbs. This allows light weight poly-carbonate pipe sections to be used. Further, in select embodiments of the present invention, small holes may be drilled in the pipe to make the beam neutrally buoyant and able to be easily filled with water and drained as it is moved in and out of the water. As the force beam (pipe) 106 approaches either the bottom or the top of its travel within the flow, the coefficient of drag is indeterminate. As the force beam approaches the bottom of the intake barrel 110, the graph of FIG. 6 no longer applies because flows are no longer unrestricted as they try to flow under the force beam 106. This indeterminate zone need not be measured since flows in this area may be extrapolated using the seventh root law. The same is true for boundary conditions at the top and sides of the intake barrels 110.

An indeterminate zone occurs within a half diameter of the force beam 106 (pipe) from the end of its travel. Thus, about 2-5% of the area to be surveyed by the force beam 106 in a typical application at a turbine intake barrel of a dam may have an indeterminate velocity. Incremental velocities observed over the remainder of the surveyed area may be used to interpolate the velocities in the indeterminate zones to reduce the margin of error.

The abstract of the disclosure is provided to comply with the rules requiring an abstract that will allow a searcher to quickly ascertain the subject matter of the technical disclosure of any patent issued from this disclosure. 37 CFR §1.72 (b). Any advantages and benefits described may not apply to all embodiments of the invention.

While the invention has been described in terms of some of its embodiments, those skilled in the art will recognize that the invention can be practiced with modifications within the spirit and scope of the appended claims. For example, although the system is described in specific examples for use in measuring flows at intake barrels of turbines, it may be used for any type of flow measurement or calibration where precision is desired. Thus select embodiments of the present invention may be useful in such diverse applications as measuring flow in open channels of known cross section, measuring fluid flow in industrial, aerospace, mining, oil and gas exploration applications, and the like. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Thus, it is intended that all matter contained in the foregoing description or shown in the accompanying drawings shall be interpreted as illustrative rather than limiting, and the invention should be defined only in accordance with the following claims and their equivalents.

I claim:

1. A system for ascertaining absolute fluid flow in a passage way, comprising:
   a configuration of known cross section, said configuration to be inserted into a fluid flowing in said passage way, said configuration placed to intersect said fluid flow at approximately ninety degrees to the direction of said fluid flow and sized to span approximately the entire width of said passage way;
   a carriage to support said configuration, said carriage enabling said configuration to move vertically in a fixed plane within said passage way with approximately no lateral deviation;
   at least one instrument in operable communication with said configuration,
   wherein said instrument records measurements of force applied to said configuration, said force resultant at least from said fluid flow, and
   wherein said recorded measurements are taken at intervals while moving said configuration in a vertical plane approximately perpendicular to the direction of said fluid flow;
   at least one data recorder for recording said measurements;
   at least one specially configured computing device for integrating said recorded measurements and employing at least one first algorithm incorporated in software contained on computing device readable media accessible by said specially configured computing device that employs said software to process said integrated recorded measurements to convert said integrated recorded measurements into at least one value of absolute flow; and
   at least one control apparatus,
   wherein said control apparatus is in operable communication with at least said carriage, said data recorder and said specially configured computing device to facilitate operation of said system.

2. The system of claim 1 in which said configuration of known cross section comprises a cylinder.

3. The system of claim 2 in which said instrument comprises at least one load cell.

4. The system of claim 3 in which said at least one load cell comprises two load cell pairs, one said pair mounted on each end of said cylinder, each said load cell of a said pair of said load cells mounted approximately 90° one from the other, each said load cell of said pair of load cells mounted approximately 45° from the longitudinal axis of said cylinder.

5. The system of claim 1 in which said configuration is emplaced in a trolley incorporating at least:
connection points for mounting said configuration;
plates for mounting said at least one instrument;
wheels for aligning and maintaining the orientation of said configuration in relation to the direction of said flow; and
at least one connector for affixing to at least one cable for hoisting said trolley.

6. The system of claim 5 further comprising at least one stabilizer device for stabilizing said configuration in said flow.

7. The system of claim 1 further comprising a support for facilitating movement of said carriage, said support comprising at least:
at least one drum hoist;
at least one cable in operable communication with said at least one drum hoist;
at least one hoist shaft in operable communication with said at least one drum hoist;
at least one motor in operable communication with each said hoist shaft;
a frame in operable communication with each of said at least one drum hoist, said at least one hoist shaft and said at least one motor,
wherein each of said at least one drum hoist, said at least one hoist shaft and said at least one motor are affixed to said frame, and
wherein at least one said cable is in operable communication with said carriage to enable vertical transport thereof.

8. The system of claim 7 further comprising connection points on said frame for at least said data recorder, said computing device and said at least one control apparatus.

9. The system of claim 1 in which at least one second algorithm is employed to adjust said integrated measurements.

10. The system of claim 1 in which said passage way comprises an intake barrel of a water turbine.

11. The system of claim 1 in which said passage way comprises an open channel of known cross section.

12. The system of claim 1 further comprising at least one loading bolt for pre-loading said configuration.

13. The system of claim 1 further comprising at least one communications link between said at least one control apparatus, said at least one data recorder and said at least one instrument, said at least one communications link chosen from the group consisting of: hard wire, fiber optics, wireless transmission paths, sonic paths, hydraulic paths, pneumatic paths, and combinations thereof.

14. The system of claim 1 in which said at least one data recorder is incorporated in said at least one instrument.

15. The system of claim 1 in operable communication with the flow to a flow measuring device to calibrate said flow measuring device.

16. The system of claim 1 in which at least the configuration of known cross section incorporating one or more instruments is approximately neutrally buoyant in said fluid.

17. A method for ascertaining absolute fluid flow in a passage way, comprising:
providing a configuration of known cross section that incorporates at least one instrument for measuring force applied to said configuration, said force resultant at least from said fluid flow;
inserting into a fluid flowing in said passageway said configuration of known cross section that incorporates at least one instrument, said configuration placed to intersect said fluid flow at approximately ninety degrees to the direction of said fluid flow and sized to span approximately the entire width of said passage way;
moving said configuration of known cross section that incorporates at least one instrument in a vertical plane approximately perpendicular to the direction of said flow while taking measurements of said force at intervals via said at least one instrument;
recording said measurements on a specially configured computing device;
integrating said recorded measurements using said specially configured computing device; and
employing a first algorithm incorporated in software contained on computing device readable media accessible by said specially configured computing device that employs said software to process said integrated recorded measurements to convert said integrated recorded measurements into at least one value of absolute flow.

18. The method of claim 17 said configuration of known cross section comprising a cylinder.

19. The method of claim 18 said instrument comprising at least one load cell.

20. The method of claim 19 said at least one load cell comprising two load cell pairs, one said pair mounted on each end of said cylinder, each said load cell of a said pair of said load cells mounted approximately 90° one from the other, each said load cell of said pair of load cells mounted approximately 45° from the longitudinal axis of said cylinder.

21. The method of claim 17 further comprising adjusting said absolute flow measurement to account for factors impacting said recorded measurements.

22. The method of claim 21 said adjusting accomplished by a second algorithm incorporated in said software contained on computing device readable media accessible by said specially configured computing device that employs said software to perform said adjusting.

23. The method of claim 21 further comprising employing said method to calibrate an apparatus used for determining fluid flow.

24. The method of claim 17 said passage way comprising an intake barrel of a water turbine.

25. The method of claim 17 said passage way comprising an open channel of known cross section.

26. The method of claim 17 further comprising pre-loading said configuration.

* * * * *